United States Patent [19]

Eipper et al.

[11] Patent Number: 5,445,300

[45] Date of Patent: Aug. 29, 1995

[54] LOAD CARRIER FOR VEHICLES

[75] Inventors: Konrad Eipper, Ammerbuch; Lothar Böttcher, Magstadt, both of Germany

[73] Assignee: Mercedes-Benz AG, Stuttgart, Germany

[21] Appl. No.: 388,989

[22] Filed: Feb. 15, 1995

Related U.S. Application Data

[63] Continuation of Ser. No. 49,850, Apr. 20, 1993, abandoned.

[30] Foreign Application Priority Data

Apr. 22, 1992 [DE] Germany .................. 42 13 216.9

[51] Int. Cl.⁶ ................................................ B60R 7/00
[52] U.S. Cl. ...................................... 224/496; 224/497;
224/501; 224/509; 224/510; 224/529; 224/537;
224/924; 224/917.5; 224/538
[58] Field of Search ................... 224/42.45 R, 42.41,
224/42.42, 42.43, 42.44, 42.03R, 42.03 B, 42.46
R, 42.07, 42.08; 414/462

[56] References Cited

U.S. PATENT DOCUMENTS

| | | | |
|---|---|---|---|
| 1,482,770 | 2/1924 | Terrell | 224/42.45 R |
| 3,251,520 | 5/1966 | Van Dyke et al. | 224/42.44 |
| 5,215,234 | 6/1993 | Pasley | 224/42.45 R |

Primary Examiner—Henry J. Recla
Assistant Examiner—David J. Walczak
Attorney, Agent, or Firm—Evenson McKeown Edwards & Lenahan

[57] ABSTRACT

A load carrier for transporting bulky articles on vehicles, having two beams connected by a cross-strut, the cross-strut being able to secure a load to be carried, has holding tubes that are securable to a rear of a vehicle and extend in a longitudinal direction of the vehicle. The beams are insertable into the holding tubes, and have angled ends. The beams are displaceable by a defined amount in the longitudinal direction in the holding tubes between a rest position in which the beams are under the vehicle and a use position in which the beams project beyond the rear of the vehicle. The beams are fixable in the rest and use positions and mounted so as to each be pivotable about the axis of one of the holding tubes into one of two different end positions. The angled ends of the beams are swivellably articulated on the cross-strut. The beams project beyond the rear of the vehicle and are swivelled upwards with their angled ends when in the use position. In the rest position, the ends of the beams are swivelled into a plane defined by the holding tubes and the beams are inserted into the holding tubes to such an extent that a rear edge of the load carrier is approximately flush with or in front of the rear end of the vehicle.

13 Claims, 4 Drawing Sheets

LOAD CARRIER FOR VEHICLES

This is a continuation of application Ser. No. 08/049,850, filed Apr. 20, 1993, now abandoned.

BACKGROUND AND SUMMARY OF THE INVENTION

The present invention relates to a load carrier for vehicles, for transporting-bulky articles, which is secured on the rear of a vehicle and is formed by at least two beams connected by at least one cross-strut. The cross-strut has means for securing the load to be carried and the beams are inserted into holding tubes extending in the longitudinal direction at the rear of the vehicle.

German Patent Document 3,717,986 describes a folding luggage carrier for passenger vehicles which is independent of the body. By means of this luggage carrier, it is possible to carry around bulky articles, such as, for example, bicycles, in the tail region of the passenger vehicle. One disadvantage of the luggage carrier is the fact that it can only be used on vehicles with a graduated vehicle rear, i.e. not on estate cars. When not in use, it must furthermore either be carried around in the mounted condition or stowed in the dismounted condition in the luggage compartment. In the mounted condition, however, it impedes access to the luggage compartment and, when carried around in the luggage compartment, takes up a considerable amount of storage space.

German Utility Model 7,630,191 discloses a load carrier which is secured in its use position on the rear of the vehicle when required by pushing it into two hollow tubes fixedly arranged on the bottom of the vehicle, by means of bolts in each case passing through a tube with the end of the carrier inserted therein. This load carrier also takes up a considerable amount of storage space for transport when not in use.

U.S. Pat. No. 5,050,785 furthermore discloses a bicycle carrier for single-bike hangers, in which the bicycle carrier is secured in a manner which allows it to be displaced both in the vertical and horizontal directions. The bicycle carrier is rigidly connected to the single-bike hanger or to the linkage securing the single-bike hanger on the vehicle.

An object of the invention is to provide a load carrier for vehicles which can be carried around on the vehicle without requiring storage space and is rapidly available without mounting work when required.

This and other objects are achieved by a load carrier for transporting bulky articles on vehicles, comprising at least two beams connected by at least one cross-strut, the cross-strut having means for securing a load to be carried. Holding tubes are provided that are securable to a rear of a vehicle and extend in a longitudinal direction of the vehicle. The beams are insertable into the holding tubes, and have angled ends. The beams are displaceable by a defined amount in the longitudinal direction in the holding tubes between a rest position in which the beams are under the vehicle and a use position in which the beams project beyond the rear of the vehicle. The beams are fixable in the rest and use positions and mounted so as to each be pivotable about the axis of one of the holding tubes into one of two different end positions. The angled ends of the beams are swivellably articulated on the cross-strut. The beams project beyond the rear of the vehicle and are swivelled upwards with their angled ends when in the use position. In the rest position, the ends of the beams are swivelled into a plane defined by the holding tubes and the beams are inserted into the holding tubes to such an extent that a rear edge of the load carrier is approximately flush with or in front of the rear end of the vehicle.

The load carrier of the present invention can be folded up and stowed underneath the floor of the rear of the vehicle when not required. When required, it can be made rapidly available in a simple manner simply by pulling out the load carrier and opening it out.

Other objects, advantages and novel features of the present invention will become apparent from the following detailed description of the invention when considered in conjunction with the accompanying drawings.

DETAILED DESCRIPTION OF THE DRAWINGS

Figure 1:
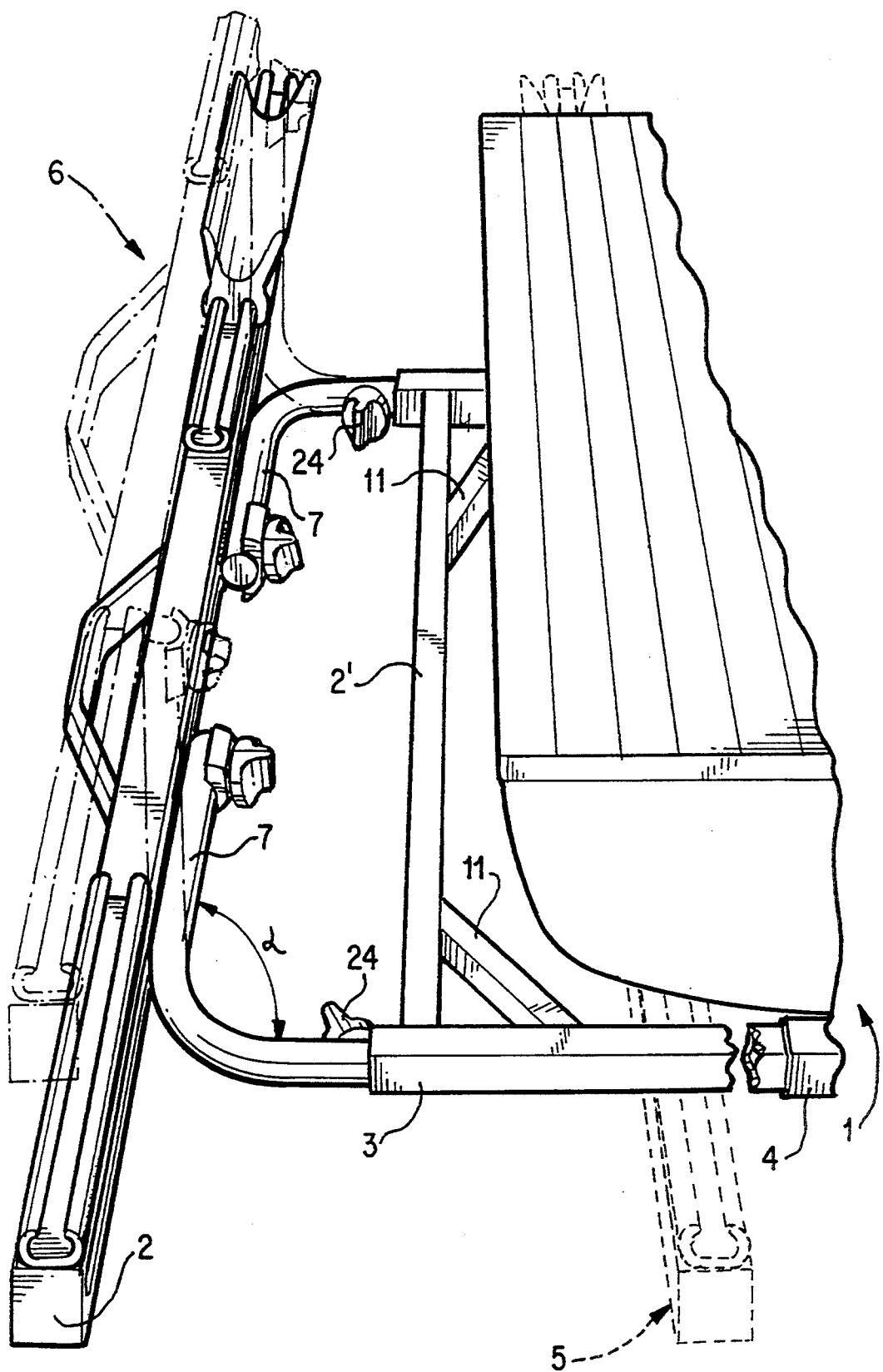
FIG. 1 shows a load carrier constructed in accordance with an embodiment of the present invention in both end positions and in an intermediate position.

In FIG. 1, longitudinally extending hollow tubes 4 are attached to the rear 1 of a vehicle. The hollow tubes 4 may be attached to longitudinal members of the vehicle in order to ensure engagement on sufficiently stable load take-up points of the body. Otherwise, it may be necessary to reinforce the region of attachment. Mounted in these hollow tubes 4 are beams which can be displaced by a certain amount, are bent at the end and can be rotated about the axis of the hollow tubes 4. Both the displacement position and the swivel position can be fixed. A cross-strut 2, of rectilinear design, at least in a certain area, is articulated in a displaceable and swivellable manner on the free ends 7 of the beams 3.

The load carrier can be moved out of the illustrated rest position 5 into a use position 6. In the rest position 5, the ends 7 of the beams 3 have been swivelled into the plane defined by the holding tubes 4, so that the faces of the ends 7 of the beams 3 face one another and the beams 3 are retracted into the holding tubes 4 to such an extent that the rear edge of the load carrier no longer projects beyond the rear end of the vehicle. This rest position 5 creates the possibility of carrying the load carrier around without taking up storage space in the vehicle and without hindering access to the vehicle. It can also be moved easily into the use position 6. By pulling out the beams 3, which then project beyond the rear 1 (seen in solid lines in FIG. 1) and swivelling the bent ends 7 of the beams upwards and by fixing the position thus reached, the use position 6 is achieved (shown in chain-dotted lines).

Figure 2:
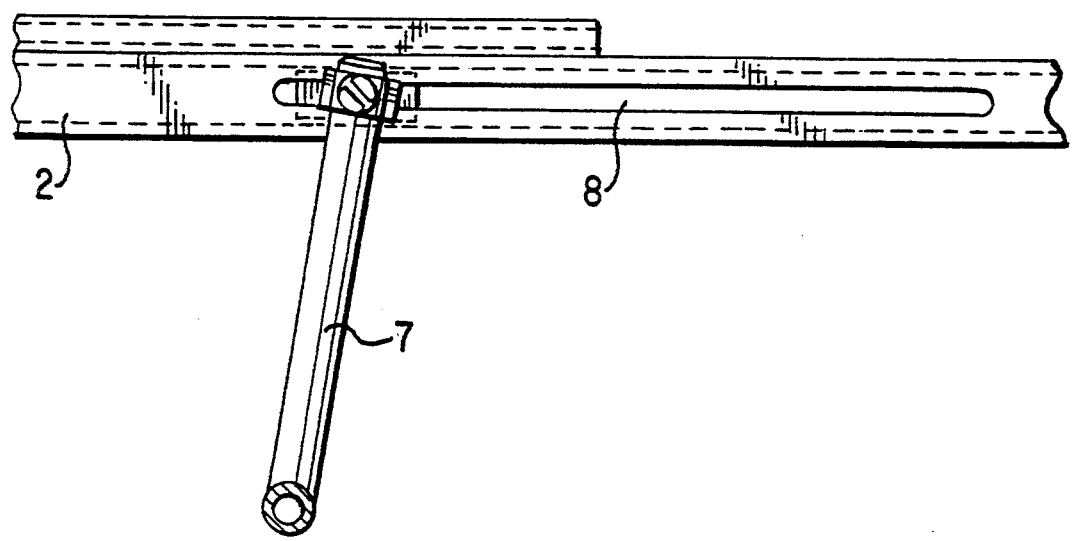
FIG. 2 shows a detail of a slideway on the cross-strut and of an attached carrier.

FIG. 2 shows a detail of the cross-strut 2. During the swivelling of the beam 3, the articulation of the cross-strut 2 slides in the slideway 8. The load is applied to the cross-strut 2.

If greater stability is to be achieved, the number of cross-struts and beams can be increased. In FIG. 1, an additional cross-strut 2' is fitted between the beams 3 and is supported on the beams 3 by diagonal struts 11 in order to achieve a higher bending stiffness. Then, however, it is necessary to divide the beam 3 into two parts 9, 10 (see FIG. 3) capable of relative rotation but not longitudinal displacement, the part 9 of the beam facing the rear 1 being longitudinally displaceably mounted in the holding tubes 4. The bent end 10 of the beam is rotatably attached to the free end of the part 9 of the beam 3.

Figure 3:
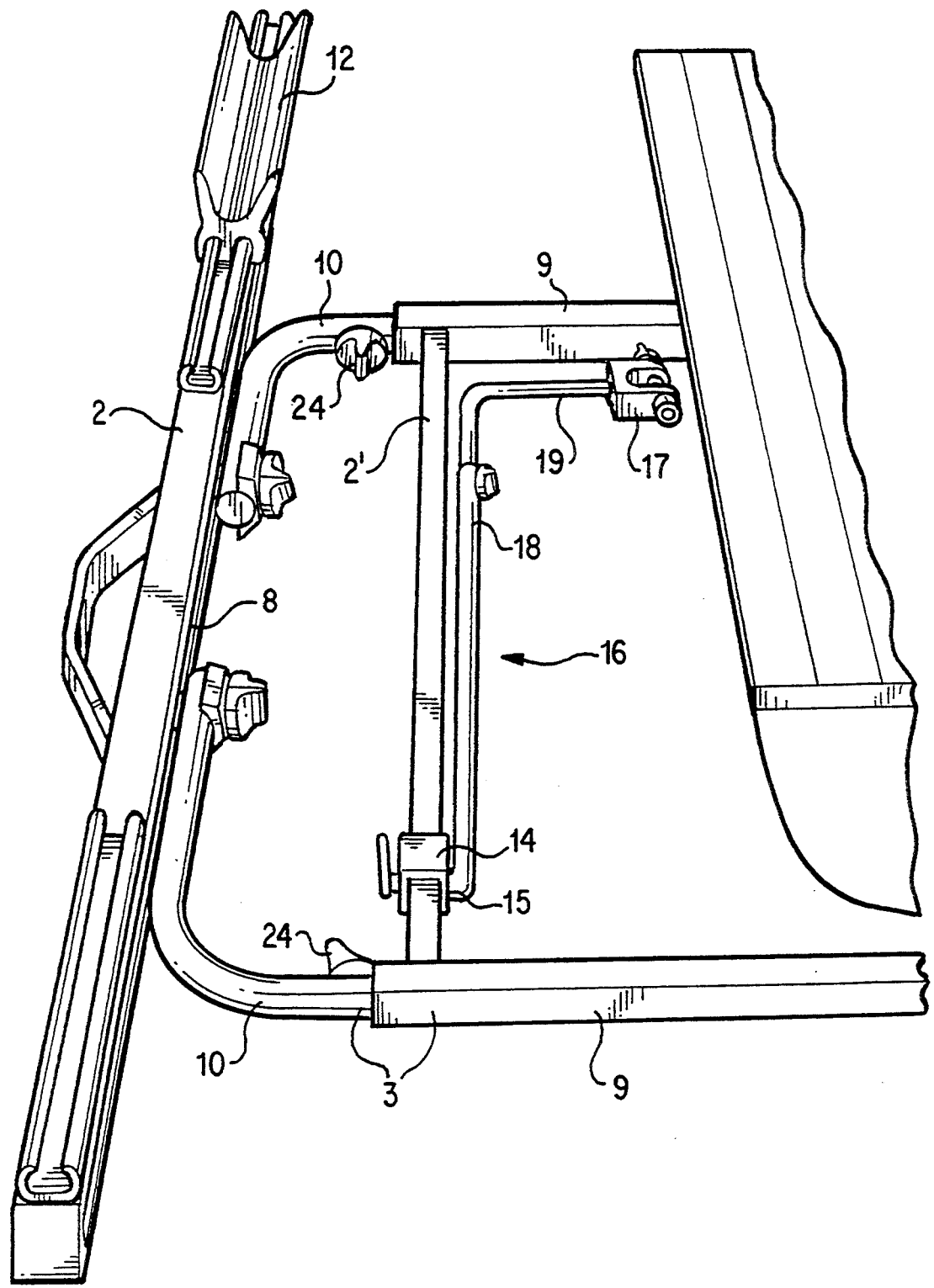
FIG. 3 shows the load carrier constructed in accordance with an embodiment of the present invention as a bicycle carrier.

To transport bicycles, Which are secured transversely to the direction of travel, holding elements 12 suitable for holding wheels can be attached to the cross-strut 2, as shown in FIG. 3. In order to provide an additional holding point in the upper region of the bicycle frame, the additional cross-strut 2' is assigned a further function. A slide 14 displaceable in the longitudinal direction of the cross-strut 2' is mounted on this cross-strut 2' in a manner which allows it to be locked in various displacement positions. Articulated on this slide 14, via a swivel joint 15, is the long leg of an L-shaped reinforcing rod 16. At the free end of a short leg 19 there is a holding clamp 17 which can hold and clamp a frame tube in the upper region of the bicycle frame. In this arrangement, the holding clamp 17 can be pivoted about an axis in the direction of the short leg 19 of the L-shaped rod 16. When the long leg 18 is designed to be telescopically extendable, as in certain embodiments, the reinforcing rod 16 is configured to be telescoped. As depicted in FIG. 3, the reinforcing rod 16 can be swivelled completely into the plane of the beams 3 in the rest position 5, with the result that the installation height of the load carrier remains small. For this reason and to provide greater flexibility of the load carrier, the holding elements 12 are also attached removably.

Figure 4:
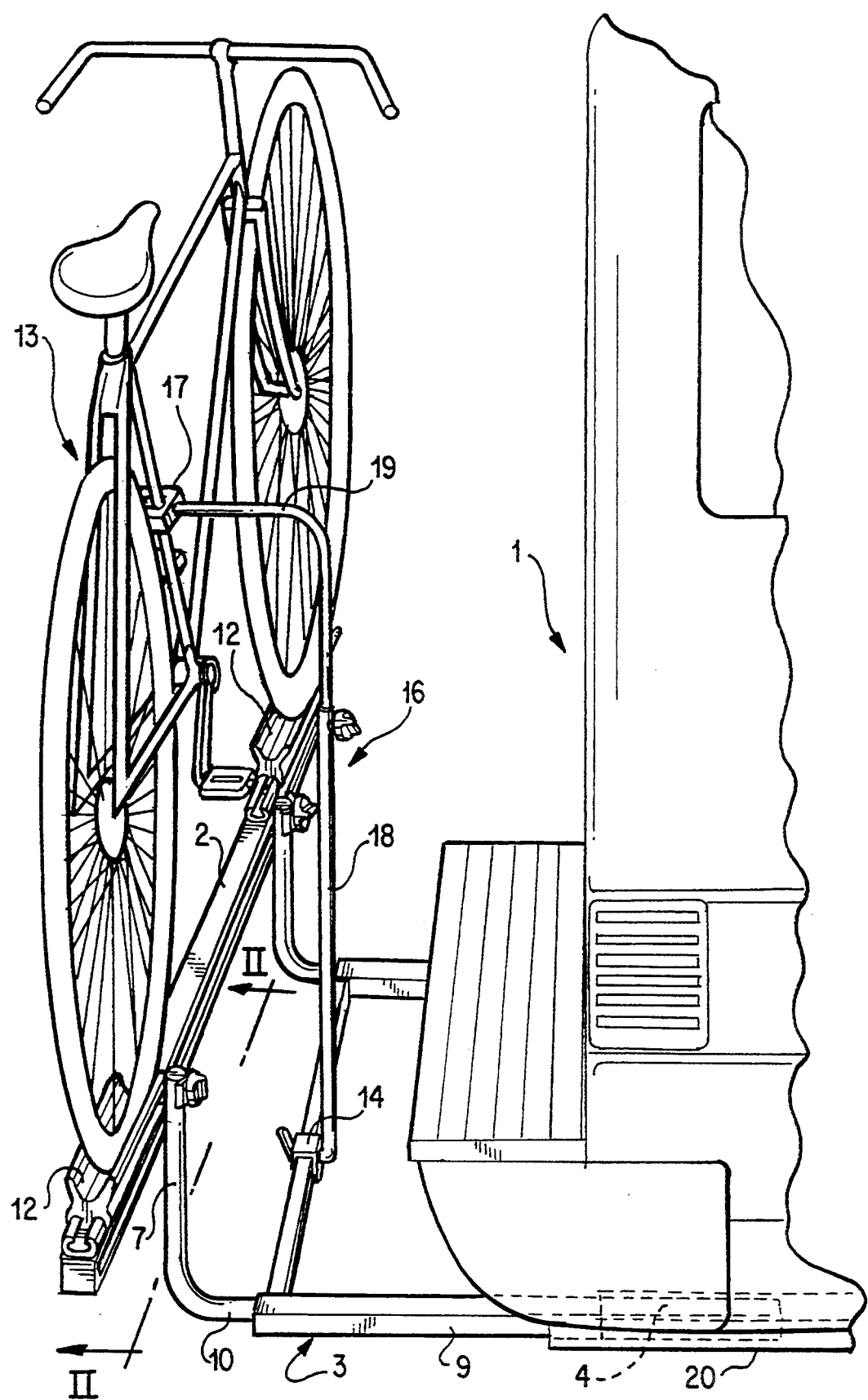
FIG. 4 shows a bicycle carrier constructed in accordance with an embodiment of the present invention in a use position.

FIG. 4 shows the load carrier on a vehicle and in its use as a bicycle carrier. The bicycle 13 stands in the holding elements 12 on the cross-strut 2 and is secured there. The holding clamp 17 holds the bicycle 13 by the frame. It is advantageous to attach the holding clamp 17 in the region of the center of gravity of the bicycle, in the longitudinal direction of the bicycle. A trough-shaped spray guard 20 is attached underneath the rear 1 of the vehicle, protecting the load carrier in the rest position from being dirtied by spray and dirt from the road and from being damaged by being struck by stones. To carry a plurality of skis in the vertical position, a suitable ski carrier can be mounted and secured on the cross-strut 2 and stabilized in the erect position by means of the reinforcing rod 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A load carrier for transporting bulky articles on vehicles, comprising:
   at least two beams connected by at least a first cross-strut, the first cross-strut having means for securing a load to be carried;
   holding tubes securable to a rear of a vehicle and extending in a longitudinal direction of the vehicle, the beams being insertable into the holding tubes and having a longitudinal axis;
   wherein each beam has a first section slidably displaceable in a respective holding tube and a second section having a first end mounted on said first section so as to be pivotable about a longitudinal axis of the first section wherein said beams are displaceable in said holding tubes by a defined amount in the longitudinal direction in the holding tubes between a storage position in which the beams are under the vehicle and a use position in which the beams project beyond a rear of the vehicle,
   wherein each second section includes an opposite end extending normal to said first section and swivellably articulated on the first cross-strut and fixable thereto;
   wherein the beams project beyond the rear of the vehicle and the opposite ends of the second sections of the beams are swivelled upwards when in the use position,
   wherein in the rest position, the ends of the second ends of the beams are swivelled into a plane defined by the holding tubes and the beams are inserted into the holding tubes to such an extent that a rear edge of the cross-strut is underneath the rear end of the vehicle.

2. The load carrier according to claim 1, wherein a bending angle of the second section is 90°.

3. The load carrier according to claim 2, further comprising a second cross-strut wherein each beam comprises an inner and an outer beam part which are attachable to each other, are rotatable relative to one another and are fixed axially relative to one another, the outer beam parts being longitudinally displaceable in the holding tubes and being mutually reinforced at a rearward end by the second cross-strut.

4. The load carrier according to claim 3, further comprising diagonal struts, each diagonal strut being connected to the second cross-strut and one of the outer beam parts to provide reinforcement of the second cross-strut at both ends.

5. The load carrier according to claim 3, further comprising a holding device for at least one bicycle and which is attached to the first cross-strut, the holding device holding a bicycle transversely to a direction of travel of the vehicle.

6. The load carrier according to claim 3, further comprising a slide mounted on the second cross-strut so as to be displaceable along the second cross-strut and locked in various displacement positions, and a reinforcing rod having a free end that bears a holding clamp for securing a bicycle held by the load carrier, said reinforcing rod being articulated on the slide in a swivellable manner via a swivel joint with a swivelling axis approximately parallel to the direction of travel of the vehicle.

7. The load carrier according to claim 6, wherein the reinforcing rod L-shaped and has a long leg attached at a free end to the swivel joint, the holding clamp being secured on a short leg of the reinforcing rod which projects rearwards.

8. The load carrier according to claim 7, wherein the long leg comprises two tubes displaceable one inside the other which are fixable relative to one another at different lengths of extension.

9. The load carrier according to claim 6, wherein the holding clamp is swivellable about an axis extending in the direction of travel.

10. The load carrier according to claim 1, further comprising a trough-shaped spray guard surrounding the load carrier in the rest position and attached to a bottom of the rear of the vehicle.

11. The load carrier according to claim 1, wherein the cross-strut is rectilinear, at least over a certain area, and that in this area the ends of the beams are displaceably articulated in a slideway.

12. The load carrier according to claim 1, wherein the rear edge of the load carrier is approximately flush with the rear end of the vehicle.

13. The load carrier according to claim 1, wherein the rear edge of the load carrier is in front of the rear end of the vehicle.

* * * * *